2 Sheets—Sheet 1.

G. W. SOULE.
Cotton and Hay Press.

No. 201,465. Patented March 19, 1878.

WITNESSES
Saml R Turner
W. J. Osgood

INVENTOR
George W. Soule
by
R. S. & A. P. Lacey
ATTORNEY

2 Sheets—Sheet 2.

G. W. SOULE.
Cotton and Hay Press.

No. 201,465. Patented March 19, 1878.

WITNESSES
Sam'l R. Turner
W. J. Osgood

INVENTOR
George W. Soule
by R. S. & A. P. Lacey
ATTORNEYS

UNITED STATES PATENT OFFICE.

GEORGE W. SOULE, OF MORTON, MISSISSIPPI.

IMPROVEMENT IN COTTON AND HAY PRESSES.

Specification forming part of Letters Patent No. 201,465, dated March 19, 1878; application filed February 13, 1878.

*To all whom it may concern:*

Be it known that I, GEORGE W. SOULE, of Morton, in the county of Scott and State of Mississippi, have invented certain new and useful Improvements in Baling-Presses; and I do hereby declare that the following is a full, clear, and exact description thereof, which will enable others skilled in the art to which it appertains to make and use the same, reference being had to the accompanying drawings, and to letters of reference marked thereon, which form a part of this specification.

This invention has for its object to furnish a baling-press in which cheapness, simplicity, and strength in construction, and great power and effectiveness in operation, are the chief points of excellence.

It consists in constructing the follower-block with beveled side blocks and recessed cam-guides; in the peculiar manner of hinging the sides of the press-box; in the manner of operating the follower-block and levers by an endless chain and double pulley on the windlass; in the manner in which the arrows are attached to the follower-block and levers; and in the construction of the levers for holding the ends of the arrows, and in other improvements, all of which will be fully hereinafter explained.

Figure 1:
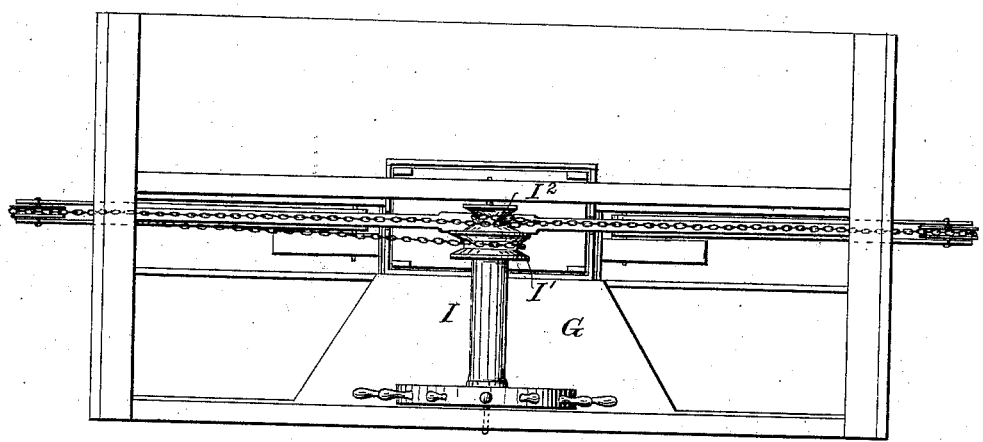
Figure 2:
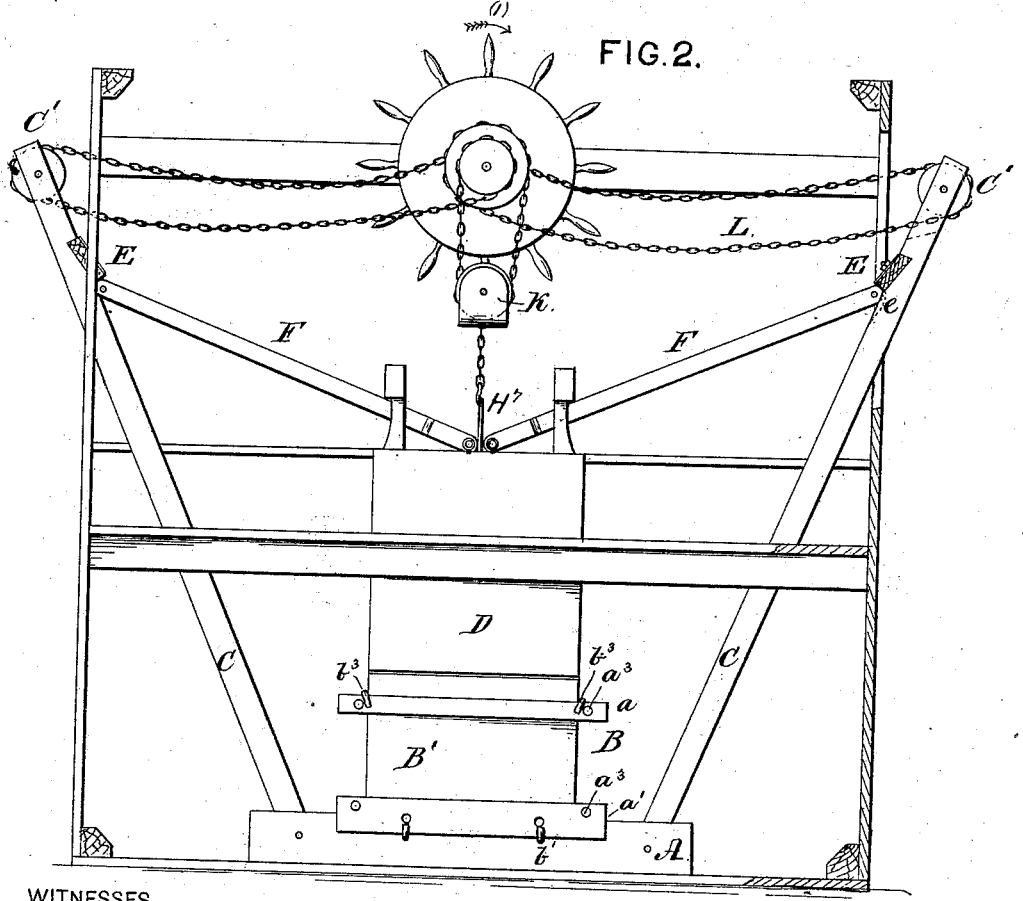
Figure 3:
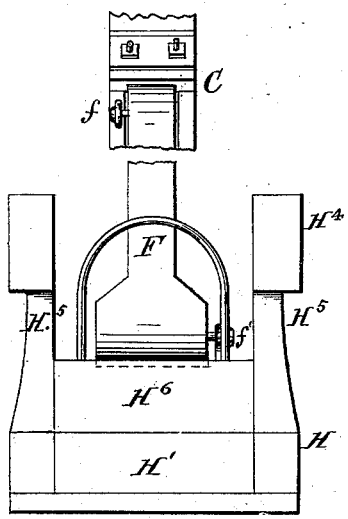
Figure 4:
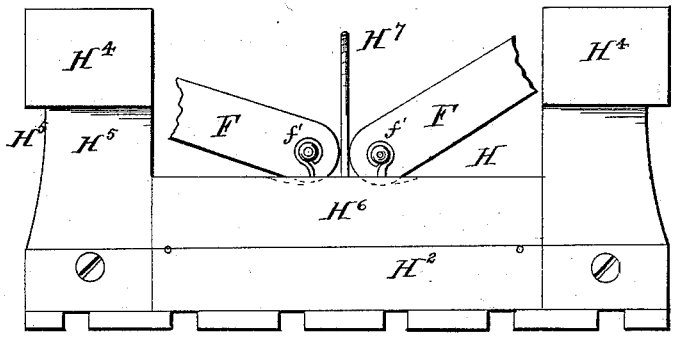
Figure 6:
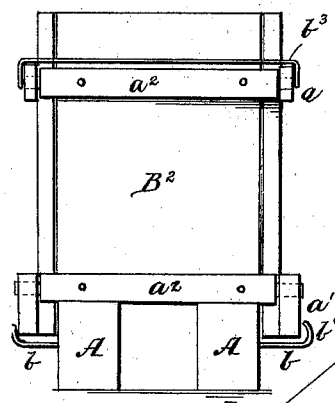
Figure 5:
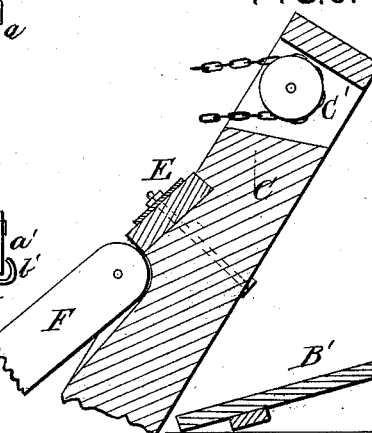
Figure 7:
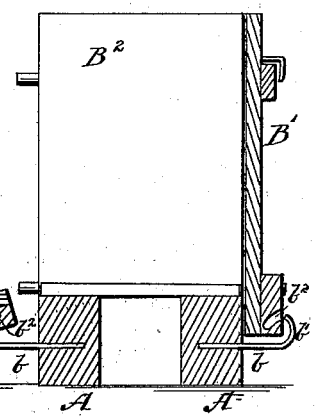
Figure 8:
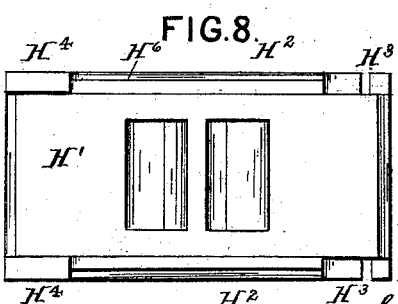

In the drawings, Figure 1 is a plan. Fig. 2 is a side elevation. Fig. 3 is an end view of the follower-block with one of the arrows, showing the mode of attachment. Fig. 4 is a side view of the follower-block and lower ends of both arrows. Fig. 5 is a vertical section of the upper end of one of the levers, showing the pulley and manner of applying the end of arrow. Fig. 6 is an end view of press-box. Fig. 7 is a cross-section of the press-box, showing the manner of hinging the sides to the bottom; and Fig. 8 is a plan of the follower-block, with two of the corner guides removed.

A are the sills, on which is placed the press-box B, and to which are pivoted the lower ends of the levers C. The sides $B^1$ and ends $B^2$ of the press-box B are provided with cross-bars or cleats $a\ a^1\ a^2$, as shown. The ends of the cleats $a^2$ on the end boards $B^2$ are extended outward, and formed so that they will readily enter the holes $a^3$ in the extended ends of the cleats $a\ a^1$ when the press-box is set for use.

$b$ are pins or bars securely fastened to the sills A, and extend outward horizontally, as shown, and have formed on their outer ends the semicircular hooks $b^1$. The side boards $B^1$ of the press-box rest on them, and may be turned down, as shown in Fig. 7, the hooks $b^1$ entering holes or recesses $b^2$, formed in the bottom cleat $a^1$. The hooks, when the press-box is set up, fit snugly against the lower cleat, and hold the lower part of the side boards firmly in place. The end boards $B^2$ are held from being crowded outward by the extension of the cleats $a^2$ in the holes in the ends of the cleats $a\ a^1$, while the upper ends or sides of the side boards $B^1$ are held by the removable clamps $b^3$.

When set up I have here a strong and substantial box. By removing the clamps $b^3$ the sides of the box will readily turn down to a horizontal position, the hooks $b^1$ serving as hinges, or may be removed altogether, if desired. The ends may also be turned down onto the sills A, or be set back out of the way, as desired.

It will be seen that I have provided a press-box possessing great strength, and at the same time having all the conveniences desired for such devices.

D is the upper box, of ordinary construction, use, and relative arrangement with reference to the press-box and other parts of the machinery.

C are the levers, pivoted at their lower ends to the sills A, and provided at their upper ends with the pulleys $C'$. They have affixed to them, below the pulleys $C'$, the blocks E, which have their upper edges let into the levers, while the lower edges project outward, as shown. These blocks E are secured immediately above the point where the arrows hereinafter described are attached to the levers. They serve to increase the strength of the lever at the points of greatest strain, to give a substantial shoulder for a bearing for the arrows without seriously cutting away the levers, and, when worn, may be readily replaced by others. The block E is set into the lever C with an incline parallel with the line of greatest force or strain exerted by the arrows when the compression of the bale is being finished. A slight recess, $e$, equal to about one-third of the thickness of the end of the arrow, is made in the lever C just below the block E, so that the arrow may be properly attached to the lever, as hereinafter explained.

F F are the arrows. They are secured, by a pin and staple, $f$, on one side, to the levers C, and by a pin and staple, $f'$, on the opposite side to the follower-block, as will be readily understood by reference to Fig. 3. The upper or outer end of the arrow bears against the block E, while the lower or inner rests in a slight recess in the top of the follower-block, as indicated in Figs. 3 and 4. The ends of the arrows resting in slight recesses in, and being secured on opposite sides to, the levers and follower-block, as explained, permit the follower-block, when raised out of the box D, to be swung off to one side onto the platform G, where it will be out of the way while the packed bale is being removed, and while preparations are being made for the packing of a new bale. When everything is ready for the pressing of the new bale, a turn or two of the windlass will raise the follower off the platform G, so that it will swing of its own gravity into position over the press-box.

H is the follower-block. It is composed of the central bar $H^1$, having a length equal to the longer diameter of the press-box, and of the side bars $H^2 H^2$, shorter than the central bar, and secured to the bar $H^1$, so as to provide corner recesses $H^3$, for the reception of the vertical guides $H^4$. Owing to the great length and width required for a follower-block for baling cotton, &c., it is difficult to get a piece of wood of the requisite size that will endure the strain or keep from warping. In a block constructed as hereinbefore described, with the wide flat bar $H^1$ and the narrower side bars $H^2 H^2$ set vertically with the corner blocks $H^4$, all secured firmly together, as shown, there is little or no liability to warp or to be pressed out of shape by the heavy pressure exerted by the arrows and levers.

The corner guides $H^4$ are extended above the top of the follower, and have the wedge-shaped recesses $H^5$ cut in their outer sides and ends, extending down to about the middle of the follower. The upper part of the side bars $H^2 H^2$ are beveled, as shown at $H^6 H^6$, to correspond with the inward slope of the recesses $H^5$, as shown. These recesses and the beveling of the side bars are for the purpose of providing a space for the doubling or folding in and holding the edges of the bagging, and thus avoid the bother and great inconvenience so often experienced in presses of ordinary construction.

$H^7$ is a rod attached to the upper side of the follower, by which the latter is connected with the endless chain or rope by which the machine is operated.

I is the windlass, arranged vertically over the center of the press-box. On it are formed two pulleys—a larger one, $I^1$, and a smaller one, $I^2$—arranged close together and immediately over the press-box, as shown.

The windlass may be turned by hand or any other suitable power. I have shown in the drawings hand-power means only.

K is a pulley, secured by links or other suitable means to the rod $H^7$ on the follower-block.

L is the endless chain. Its upper part or half extends between and passes over and around the pulleys $C' C'$ on the levers C, while one end of the upper portion passes around the larger pulley $I^1$, and the other end around the small pulley $I^2$ on the windlass I, and both ends are united together around the pulley K, as shown in Fig. 2.

In the operation of the machine, if the windlass be turned in the direction of the arrow, Fig. 2, the chain will be taken up and the levers drawn together, causing the arrows to push the follower down into the press-box. At the same time that the chain is shortened between the levers it is paid out or lengthened below, and lets the follower-block down as rapidly as the necessities of the inward movements of the levers require.

The reverse movement of the windlass lifts the follower and lets out the chain to the levers, which fall back into the positions indicated in Fig. 2, and raises the follower out of the box, so that it may be swung aside, as hereinbefore explained.

Having described my invention, what I claim, and desire to secure by Letters Patent, is—

1. In a baling-press, the windlass I, constructed with the pulleys $I^1 I^2$ of different diameters, and arranged immediately over the press-box, in combination with the operating-levers, chain or rope, and follower-block, as set forth.

2. In a baling-press, the follower-block H, suspended on the actuating-cable L, and pivoted to the arrows F and levers C, with capability of lateral movement when withdrawn from the press-box, substantially as and for the purpose set forth.

3. The follower-block constructed with the central block $H^1$, and side pieces $H^2 H^2$, and corner recesses $H^3 H^3$, for the reception of the guides $H^4$, all arranged substantially as set forth.

4. The follower-block having the beveled edges $H^6 H^6$, provided with the vertical guides $H^4$, having the beveled recesses $H^5 H^5$, as and for the purpose set forth.

5. In a press-box for baling-machines, the pins $b$, projecting from the sills A, and constructed with the hooks $b^1$, and adapted to support and serve as hinges for the side doors $B^1$, having the curved holes or recesses $b^2$, substantially as set forth.

In testimony that I claim the foregoing as my own I affix my signature in presence of two witnesses.

GEORGE W. SOULE.

Witnesses:
J. B. CHARLES,
FRANK WILLIAMS.